J. P. MAUER.
AUTOMOBILE LOCK.
APPLICATION FILED FEB. 17, 1915.
1,152,117.
Patented Aug. 31, 1915.
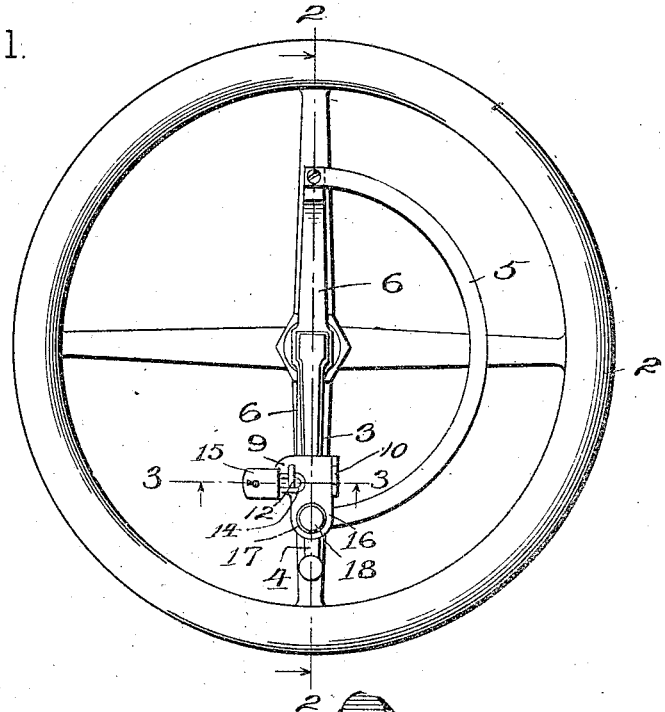
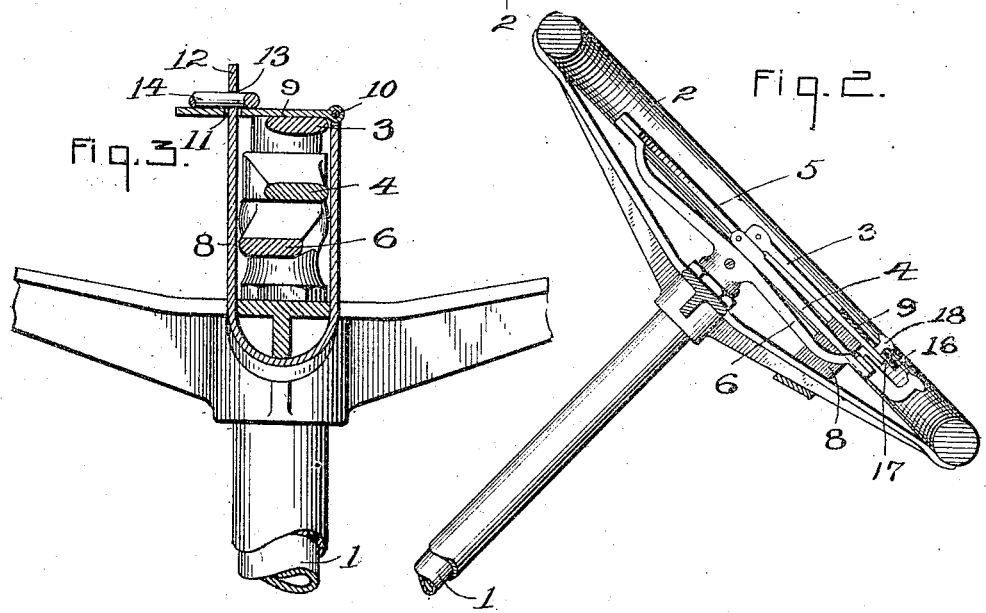
WITNESSES
INVENTOR
Jacob P. Mauer,
by Geyer Popp,
ATTORNEYS

UNITED STATES PATENT OFFICE.

JACOB P. MAUER, OF BUFFALO, NEW YORK.

AUTOMOBILE-LOCK.

1,152,117.  Specification of Letters Patent.  Patented Aug. 31, 1915.

Application filed February 17, 1915. Serial No. 8,774.

*To all whom it may concern:*

Be it known that I, JACOB P. MAUER, a citizen of the United States, residing at Buffalo, in the county of Erie and State of New York, have invented new and useful Improvements in Automobile-Locks, of which the following is a specification.

This invention relates to the locking devices employed on automobiles to prevent their theft or unauthorized use, and more particularly to a device of this character which is adapted to lock the spark and throttle-levers and preferably also the steering wheel.

The object of the invention is the provision of a simple, reliable and inexpensive lock of this kind which can be readily applied to and removed from the parts to be locked.

In the accompanying drawing: Figure 1 is a top plan view of the steering wheel and spark and throttle levers of an automobile equipped with the lock. Fig. 2 is a vertical section on line 2—2, Fig. 1. Fig. 3 is a similar section on line 3—3, Fig. 1, on an enlarged scale.

Similar characters of reference indicate corresponding parts in the several views.

1 indicates the steering shaft having the customary wheel 2.

3 indicates the spark lever and 4 the throttle or gas-controlling lever which latter traverses the usual segment 5 carried by the fixed arms 6. In the construction shown, these levers are arranged one above the other and in alinement with each other on the same side of the steering shaft when the motor is at rest, as for example, in the "Overland" car.

The improved lock comprises an approximately U-shaped body or frame 8 adapted and constructed to embrace the alined spark and throttle-levers, one of the arms 6 of the fixed segment and preferably also one of the spokes of the steering wheel, as shown in the drawings, so as to lock said levers against turning and render it impossible to start the motor of the car, or to turn the steering wheel, so long as the locking device remains in place. For this purpose, the frame 8 is just wide enough to pass easily over said wheel-spoke segment arm and levers and yet prevent undue lateral play of the levers therein. In the preferred embodiment of the invention illustrated in the drawings, the frame 8 is provided at its upper end with a movable bar or hasp 9 which normally closes or bridges its open end. This hasp is hinged to one of the side bars of the frame, as shown at 10, and provided in its free end with a slot or opening 11 which receives an upward extension 12 of the other side bar of the frame. This extension has a hole 13 adapted to receive the bow 14 of a pad-lock 15 or equivalent locking device, whereby the hasp is confined in its closed position in which it bridges the upper or spark lever and retains the frame in place.

To effectually lock the spark and throttle levers with a minimum amount of lateral play, the locking device should be located at or near the free ends of the levers, as shown in the drawings. If the device were placed near the inner ends of the levers, it might permit them to be turned sufficiently to start the motor. Suitable means are provided to guard against such displacement or shifting of the locking device from the outer toward the inner ends of the levers. The preferred device shown in the drawings consists of a lug or ear 16 extending laterally from the hasp and containing an eye or opening 17, arranged to receive the handle or projection 18 of one of the said levers, preferably the spark lever, thereby reliably securing the auto-lock against such inward or radial displacement on the levers.

Before applying the lock, the spark and throttle levers are brought in line with each other at the front end of the segment 5 and the steering wheel is turned to the right until one of its spokes comes under the alined levers, as shown in the drawings. The frame 8, with its hasp thrown open, is then passed upwardly over the wheel-spoke, segment-arm 6 and the levers, after which the hasp is closed and locked in place by means of the padlock, the hasp being interlocked with the handle 18 of the spark lever in closing it. By turning the steering wheel to the right before applying the lock, the front wheels of the car are turned toward and blocked by the street-curb, defeating any attempt to move the automobile by means of the self-starter.

This improved lock renders it impossible to move either the spark or the throttle-lever far enough to start the motor and therefore provides an effectual safeguard against theft of the car or its use by unauthorized persons, and by engaging the steering wheel as well as said levers, it also locks said wheel and prevents steering of the car, even if it be attempted to propel it by the self-starter.

The lock can be quickly and conveniently applied and removed, while its simple construction enables it to be manufactured at a relatively small cost.

I claim as my invention:

1. The combination with the spark and throttle levers, the steering wheel and an adjacent fixed part of an automobile, of a locking device comprising an approximately U-shaped frame constructed to embrace said levers, said fixed part and the steering wheel, a movable member for closing the open end of said frame, means for locking said movable member, and means for holding said frame from displacement lengthwise of said levers.

2. An automobile lock comprising an approximately U-shaped frame constructed to embrace the spark and throttle levers and a relatively fixed part of an automobile, said frame having a movable member for closing the open end thereof and means arranged to engage one of said levers for holding the frame from displacement lengthwise of the levers, and means for locking said movable member.

3. An automobile lock, comprising an approximately U-shaped frame constructed to embrace the spark and throttle levers and a relatively fixed part of an automobile, said frame having a movable member for closing the open end of said frame, and an opening arranged to receive the handle of one of said levers.

4. An automobile lock, comprising an approximately U-shaped frame constructed to embrace the spark and throttle levers and a relatively fixed part of an automobile, a hasp bridging the open end of said frame and having means for engaging the handle of one of said levers, and locking means for said hasp.

5. An automobile lock, comprising an approximately U-shaped frame constructed to embrace the spark and throttle levers and a relatively fixed part of an automobile, a hasp hinged to the open end of said frame for closing the same, said hasp having an eye arranged to engage the handle of one of said levers, and locking means for said hasp.

6. An automobile lock, comprising an approximately U-shaped frame constructed to embrace the spark and throttle levers and a relatively fixed part of an automobile, a hasp hinged to the open end of said frame for closing the same, said hasp having a laterally-extending lug provided with an opening arranged to receive the handle of one of said levers, and locking means for said hasp.

Witness my hand this 15th day of February, 1915.

JACOB P. MAUER.

Witnesses:
C. F. GEYER,
E. M. GRAHAM.